(12) United States Patent
Nakamura et al.

(10) Patent No.: US 7,599,119 B2
(45) Date of Patent: Oct. 6, 2009

(54) ANTIREFLECTION COATING, OPTICAL ELEMENT, AND OPTICAL TRANSCEIVER MODULE

(75) Inventors: Katsuya Nakamura, Kanagawa (JP); Tatsuo Ohta, Otsuki (JP); Setsuo Tokuhiro, Tokorozawa (JP); Kunihiko Taka, Musashino (JP); Shingo Nakamura, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 251 days.

(21) Appl. No.: 11/331,018

(22) Filed: Jan. 13, 2006

(65) Prior Publication Data
US 2006/0158738 A1  Jul. 20, 2006

(30) Foreign Application Priority Data
Jan. 19, 2005 (JP) .............................. 2005-011727
Jul. 22, 2005 (JP) .............................. 2005-212585

(51) Int. Cl.
*G02B 1/10* (2006.01)
(52) U.S. Cl. .................. 359/586; 359/581; 359/589
(58) Field of Classification Search .............. 359/586, 359/581, 589
See application file for complete search history.

(56) References Cited

U.S. PATENT DOCUMENTS

| 4,568,140 A | * | 2/1986 | van der Werf et al. ........ 359/359 |
| 5,930,046 A | * | 7/1999 | Solberg et al. .............. 359/580 |
| 2007/0030569 A1 | * | 2/2007 | Lu et al. ..................... 359/586 |

FOREIGN PATENT DOCUMENTS

| JP | 2000-180671 | 6/2000 |
| JP | 2003-344715 | 12/2003 |
| JP | 2004-037928 | 2/2004 |

* cited by examiner

*Primary Examiner*—Joshua L Pritchett
(74) *Attorney, Agent, or Firm*—Finnegan, Henderson, Farabow, Garrett & Dunner, L.L.P.

(57) ABSTRACT

An antireflection coating provided on an optical element which passes through at least two wavelengths of light in the wavelength range of 1300-1600 nm, wherein the antireflection coating comprises: a high refractive index layer; a low refractive index layer having a refractive index lower than a refractive index of the high refractive index layer; and a supplementary layer having a composition different from a composition of the high refractive index layer or from a composition of the low refractive index layer, and being provided adjacent to the high refractive index layer or to the low refractive index layer.

37 Claims, 12 Drawing Sheets

FIG. 19

| | CONSTRUCTION | 85°C DRY | 95°C DRY | 100°C DRY | 85°C 85% | HEAT CYCLE |
|---|---|---|---|---|---|---|
| EXAMPLE 1 | TABLE 1 | A | A | A | A | A |
| EXAMPLE 2 | TABLE 2 | A | A | A | A | A |
| EXAMPLE 3 | TABLE 3 | A | A | A | A | A |
| EXAMPLE 4 | TABLE 4 | A | A | A | A | A |
| EXAMPLE 5 | TABLE 5 | A | A | A | A | A |
| EXAMPLE 6 | TABLE 6 | A | A | A | A | A |
| EXAMPLE 7 | TABLE 7 | A | A | A | A | A |
| EXAMPLE 8 | TABLE 8 | A | A | A | A | A |
| EXAMPLE 9 | TABLE 9 | A | A | A | A | A |
| EXAMPLE 10 | TABLE 10 | A | A | A | A | A |
| EXAMPLE 11 | TABLE 11 | A | A | B | A | A |
| EXAMPLE 12 | TABLE 12 | A | A | A | A | A |
| EXAMPLE 13 | TABLE 13 | A | A | A | A | A |
| COMPARATIVE 1 | TABLE 14 | CRACK | - | - | - | - |
| COMPARATIVE 2 | TABLE 15 | - | - | CRACK | - | - |

|  | CONSTRUCTION | CRACK (100°CDRY) | FILM PEELING (BOILING TEST) |
|---|---|---|---|
| EXAMPLE 11 | TABLE 11 | B | B |
| EXAMPLE 14 | TABLE 16 | B | A |
| EXAMPLE 15 | TABLE 17 | A | A |
| EXAMPLE 16 | TABLE 18 | A | A |

ANTIREFLECTION COATING, OPTICAL ELEMENT, AND OPTICAL TRANSCEIVER MODULE

This application is based on Japanese Patent Application No. 2005-011727 filed on Jan. 19, 2005, and No. 2005-212585 filed on Jul. 22, 2005 in Japanese Patent Office, the entire content of which is hereby incorporated by reference.

TECHNICAL FIELD

The present invention relates to an antireflection coating an optical element provided with the antireflection coating, and optical transceiver module provided with the optical element.

BACKGROUND OF THE INVENTION

Conventionally, as apparatuses that carry out communication through optical fibers, optical transceiver modules have been known that carry out transmission and reception of signals using two wavelengths of light, $\lambda_1$ and $\lambda_2$, in the range of 1300-1600 nm.

Such optical transceiver modules are provided with a lens between the end surface of the optical fiber and a light receiving element or a light emitting element, and on the optical surface of the lens, provided are thin films or a diffraction structure that change the optical path depending on the wavelength (see, for example, Patent Documents 1-3). In the interior of the optical transceiver module, not only light of wavelength $\lambda_1$ emitted from the end surface of the optical fiber is incident on the light receiving element, but also light of wavelength $\lambda_2$ emitted from the light emitting element is incident on the end surface of the optical fiber.

An antireflection coating is provided, in order to increase transmission, on an optical element that allows passing low wavelength light of 650 nm or 780 nm through them.

However, when an antireflection coating known in the art for low wavelength light of 650 nm or 780 nm are merely applied as an antireflection coating provided for an optical element used for light of wavelength of 1300-1600 nm, the transmittance can be improved, however, because of the longer wavelength, the thicknesses of the layers constituting the antireflection coating become larger compared to those of known antireflection coatings. As a result, if the body of the lens is made of plastic, the distortion due to internal stresses within the constituting layers become larger when the shape of the lens body changes due to changes in temperature or humidity, resulting in forming cracks. Accordingly, the durability of the lens is reduced.

Patent Document 1: Japanese Patent Publication Open to Public Inspection (hereafter referred to as JP-A) No. 2000-180671

Patent Document 2: JP-A No. 2004-37928
Patent Document 3: JP-A No. 2003-344715

SUMMARY OF THE INVENTION

An object of the present invention is to provide an antireflection coating of which durability is improved compared to the conventional antireflection coatings without lowering the light transmittance, an optical element provided with the antireflection coating, and an optical transceiver module provided with the optical element.

One of the aspects of the present invention is an antireflection coating provided on an optical element which passes through at least two wavelengths of light in the wavelength range of 1300-1600 nm, wherein the antireflection coating comprises: a high refractive index layer; a low refractive index layer having a refractive index lower than a refractive index of the high refractive index layer; and a supplementary layer having a composition different from a composition of the high refractive index layer or from a composition of the low refractive index layer, and being provided adjacent to the high refractive index layer or to the low refractive index layer.

BRIEF DESCRIPTION OF THE DRAWINGS

FIG. 19 summarizes the durability of the lenses of Examples 1-13 and Comparatives 1 and 2.

DESCRIPTION OF THE PREFERRED EMBODIMENTS

Figure 1:
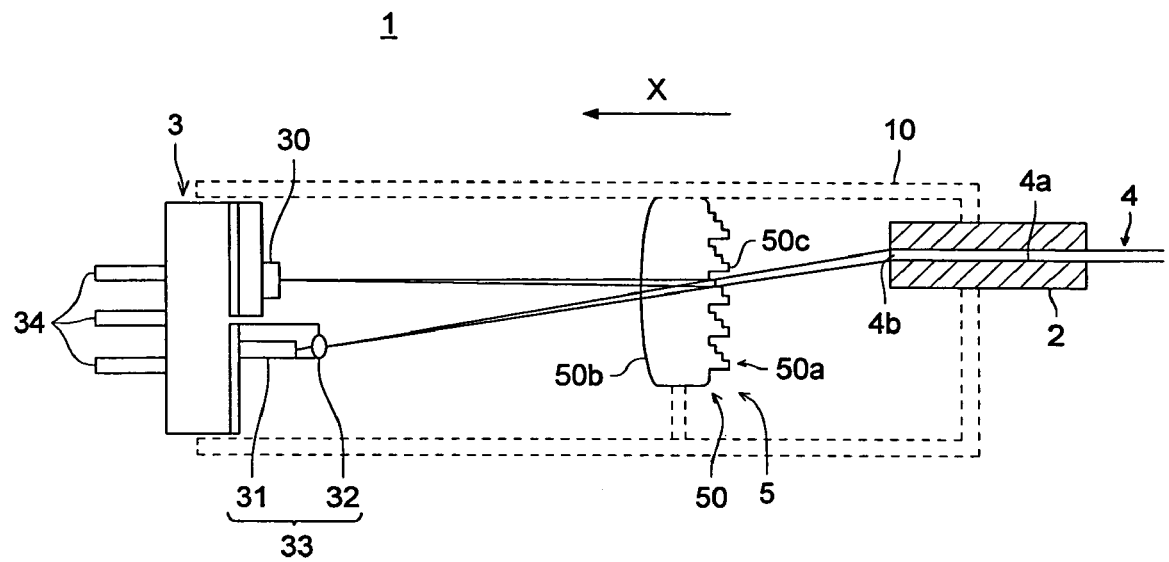
FIG. 1 is a schematic illustration of an example of transceiver module of the present invention.

The above object of the present invention is achieved by the following structures.

(1) An antireflection coating provided on an optical element which passes through at least two wavelengths of light in the wavelength range of 1300-1600 nm, wherein the antireflection coating contains:
a high refractive index layer;
a low refractive index layer having a refractive index lower than a refractive index of the high refractive index layer; and
a supplementary layer having a composition different from a composition of the high refractive index layer or from a composition of the low refractive index layer, and being provided adjacent to the high refractive index layer or to the low refractive index layer.

According to the invention of Item (1), since the antireflection coating contains a high refractive index layer and a low refractive index layer, reflection of at least two wavelengths of light in the wavelength range of 1300-1600 nm is minimized, whereby the degradation of transmittance is avoided.

Further, since a supplementary layer having a composition different from a composition of the high refractive index layer or from a composition of the low refractive index layer is provided adjacent to the high refractive index layer or to the low refractive index layer, the thickness of the high refractive index layer or a thickness of the low refractive index layer becomes smaller by being separated by the supplementary layer, compared to the case when no supplementary layer is used, namely, a known antireflection coating for light of wavelengths of 650 nm or 780 nm, is simply applied to an antireflection coating for light of wavelengths of 1300-1600 nm. Accordingly, a layer stress of each layer in the antireflection coating is kept low and cracks tend not to be formed, even when temperature or humidity changes. Namely, the durability of the lens is increased without decreasing the transmittance.

The thickness of the supplementary layer may be larger or may be smaller than the thickness of the adjacent high refractive index layer or the low refractive index layer, however, in order to decrease the thickness of the antireflection coating, thickness of the supplementary layer is preferably smaller than the thickness of the high refractive index layer or the low refractive index layer.

(2) The antireflection coating of Item (1), wherein
the antireflection coating contains two high refractive index layers; and
the supplementary layer is provided between the two high refractive index layers.

According to the invention of Item (2), since the supplementary layer is provided between the two high refractive index layer, the high refractive index layer is separated into two parts, and the thickness of each high refractive index layer becomes smaller compared to the case when no supplementary layer is provided, whereby occurrence of cracks in the high refractive index layer is suppressed.

(3) The antireflection coating of Item (2), wherein the high refractive index layers each contains a high refractive index material exhibiting a refractive index of 1.8 or less when measured at a wavelength of 1450 nm.

In the present invention, a high refractive index material represents a material having a refractive index of 1.55 or more when measured at a wavelength of 1450 nm.

According to the invention of Item (3), when the high refractive index layer contains a high refractive index material exhibiting a refractive index of 1.8 or less at a wavelength of 1450 nm, and the thickness of the high refractive index layer is large, a similar effect as that of the invention of Item (2) is obtained.

(4) The antireflection coating of Item (2) or Item (3), wherein
the high refractive index layers each contains a high refractive index material selected from the group consisting of: aluminum oxide, cerium oxide, lanthanum oxide, magnesium oxide, praseodymium oxide, scandium oxide, silicon monoxide, thorium oxide, and yttrium oxide as a main component.

According to the invention of Item (4), a similar effect as that of the invention of Item (2) or Item (3) is obtained.

Herein, "as a main component" means that the following cases are included: (i) only the one of the above described compounds is contained; and (ii) an accessory component is also contained together with one of the above described compounds.

(5) The antireflection coating of Item (4), wherein at least one of the high refractive index layers contains cerium oxide as a main component.

According to the invention of Item (5), a similar effect as that of the invention of Item (4) is obtained.

(6) The antireflection coating of any one of Items (2)-(5), wherein the high refractive index layers each has a thickness of 30-70 nm.

According to the invention of Item (6), since the thickness of the high refractive index layer as small as 30-70 nm, occurrence of cracks in the high refractive index layer is steadily suppressed.

(7) The antireflection coating of any one of Items (2)-(6), wherein the supplementary layer has a thickness of 5-30 nm.

In general, in order to uniformly form the above each layer, the thickness of each layer is preferably, 5 nm or more.

According to the invention of Item (8), since the thickness of the supplementary layer is not more than 30 nm, degradation of the transmittance of light is minimized compared to when the thickness is more than 30 nm. Further, since the thickness of the supplementary layer is not less than 5 nm, the supplementary layer can be formed more uniformly compared to when the thickness is less than 5 nm.

The thickness of the supplementary layer is preferably 10 nm or more, in view of productivity of the antireflection coating.

(8) The antireflection coating of any one of Items (2)-(7), wherein the supplementary layer exhibits a layer stress lower than a layer stress of each of the high refractive index layers.

The layer stress is defined as a positive value when it is a tensile stress, while the layer stress is defined as a negative value when it is a compressive stress. Also, "exhibiting a different layer stress" means that the layer stresses of the films formed, for example, on a glass plate are different by 10 MPa or more.

According to the invention of Item (8), a similar effect as that of the invention of any one of Items (2)-(7) is obtained. When the layer stress of the high refractive index layer is positive, the layer stress of the supplementary layer is preferably negative.

(9) The antireflection coating of any one of Items (2)-(8), wherein,
on a body of the optical element, (i) the high refractive index layer, (ii) the supplementary layer, (iii) the high refractive index layer and (iv) the low refractive index layer, are provided in that order; and
the two high refractive index layers have the same composition.

According to the invention of Item (9), a similar effect as that of the invention of any one of Items (2)-(8) is obtained.

(10) The antireflection coating of Item (1), wherein
the supplementary layer is provided adjacent to the low refractive index layer; and
the low refractive index layer and the supplementary layer each contains a low refractive index material.

According to the invention of Item (10), since the supplementary layer is provided adjacent to the low refractive index layer, and the low refractive index layer and the supplementary layer each contains a low refractive index material, the supplementary layer and the low refractive index layer exhibit a similar reflection characteristic, and a part of the reflection function of the low refractive index layer can be transferred to the supplementary layer. Therefore, the thickness of the low refractive index layer can be more decreased, compared to when no supplementary layer is used, whereby the occurrence of cracks in the low refractive index layer is steadily suppressed.

In the present invention, a low refractive index material represents a material having a refractive index of less than 1.55 when measured at a wavelength of 1450 nm.

(11) The antireflection coating of Item (10), wherein the antireflection coating contains two low refractive index layers; and the supplementary layer is provided between the two low refractive index layers.

According to the invention of Item (11), the supplementary layer is provided between the two low refractive index layers, which means that one low refractive index layer is separated into two layers and the thickness of each low refractive index layer is smaller compared to when no supplementary layer is used, whereby the occurrence of cracks in the low refractive index layer is steadily suppressed.

(12) The antireflection coating of Item (11), wherein the antireflection coating contains two supplementary layers each of which is separately provided between the two low refractive index layers, wherein the two supplementary layers are not provided adjacent to each other.

The expression "two supplementary layers are separately provided between the two low refractive index layers" means that a pair of low refractive index layers between which one supplementary layer is provided and another pair of low refractive index layers between which the other supplementary layer is provided are different, where two pairs of low refractive index layers are different means that at least each one low refractive index layer of the two paired low refractive index layers are different.

According to the invention of Item (12), a similar effect as that of the invention of Items (11) is obtained.

(13) The antireflection coating of Item (11) or Item (12), wherein the supplementary layer exhibits a layer stress which is reverse to layer stresses of the low refractive index layers.

Layer stresses include a compressive stress and a tensile stress. The expression "the layer stresses are reverse" means that one layer stress is a tensile stress (positive) while the other layer stress is a compressive stress (negative).

When a layer in the antireflection coating is thick, the film may be peeled because the neighboring layer is pulled by the layer stress generated in the layer.

According to the invention of Item (13), since the supplementary layer exhibits a layer stress which is reverse to layer stresses of the low refractive index layers the layer stresses of the low refractive index layers sandwiching the supplementary layer are relaxed by the layer stress generated in the supplementary layer. Accordingly, the force to pull the neighboring layer generated by the layer stresses of the low refractive index layers is reduced, whereby occurrence of peel in the antireflection coating is suppressed.

(14) The antireflection coating of any one of Items (10)-(13), wherein a ratio of a total thickness of the low refractive index layers to a thickness of the supplementary layer is in the range of 2:1-4:1.

According to the invention of Item (14), since the ratio of a total thickness of the low refractive index layers to a thickness of the supplementary layer is in the range of 2:1-4:1, the occurrence of cracks in the low refractive index layer is more steadily suppressed, compared to when the ratio is less than 2:1 or when the ration is more than 4:1.

(15) The antireflection coating of any one of Items (10)-(14), wherein the high refractive index layer contains a high refractive index material exhibiting a refractive index of 1.8 or more when measured at a wavelength of 1450 nm.

According to the invention of Item (15), a similar effect as that of the invention of any one of Items (10)-(14) is obtained.

(16) The antireflection coating of any one of Items (10)-(15), wherein the high refractive index layer contains a high refractive index material selected from the group consisting of: hafnium dioxide, tantalum pentaoxide (tantalum (V) oxide), titanium dioxide and zirconium dioxide, as a main component.

According to the invention of Item (16), a similar effect as that of the invention of any one of Items (10)-(15) is obtained.

(17) The antireflection coating of any one of Items (10)-(16), wherein a thickness of the high refractive index layer is not more than 70 nm.

According to the invention of Item (17), since the thickness of the high refractive index layer is not more than 70 nm, the occurrence of cracks in the high refractive index layer is steadily suppressed.

(18) The antireflection coating of any one of Items (10)-(17), wherein the supplementary layer exhibits a layer stress higher than a layer stress of the low refractive index layer.

According to the invention of Item (18), a similar effect as that of the invention of any one of Items (10)-(17) is obtained.

(19) The antireflection coating of any one of Items (10)-(18), wherein, on a body of the optical element, (i) the high refractive index layer, (ii) the low refractive index layer, (iii) the supplementary layer and (iv) the low refractive index layer, are provided in that order; and the two low refractive index layers have the same composition.

According to the invention of Item (19), a similar effect as that of the invention of any one of Items (10)-(18) is obtained.

(20) The antireflection coating of Item (1), wherein the optical element contains a first supplementary layer, a second supplementary layer and two high refractive index layers;

the first supplementary layer is provided between the two high refractive index layers;

the second supplementary layer is provided adjacent to the low refractive index layer; and the low refractive index layer and the supplementary layers each contains a low refractive index material.

According to the invention of Item (20), the supplementary layer is provided between the two high refractive index layers, which means that one high refractive index layer is separated into two layers and the thickness of each high refractive index layer is smaller compared to when no supplementary layer is used, whereby the occurrence of cracks in the high refractive index layer is steadily suppressed.

Also, since the supplementary layer is provided adjacent to the low refractive index layer, and the low refractive index layer and the supplementary layer each contains a low refractive index material, the supplementary layer and the low refractive index layer exhibit a similar reflection characteristic, and a part of the reflection function of the low refractive index layer can be transferred to the supplementary layer. Therefore, the thickness of the low refractive index layer can be more decreased, compared to when no supplementary layer is used, whereby the occurrence of cracks in the low refractive index layer is steadily suppressed.

(21) The antireflection coating of Item (20), wherein the high refractive index layers each contains a high refractive index material exhibiting a refractive index of 1.8 or less when measured at a wavelength of 1450 nm.

According to the invention of Item (21), when the high refractive index layer contains a high refractive index material exhibiting a refractive index of 1.8 or less at a wavelength of 1450 nm, and the thickness of the high refractive index layer is large, a similar effect as that of the invention of Item (20) is obtained.

(22) The antireflection coating of Item (20) or Item (21), wherein the high refractive index layers each contains a high refractive index material selected from the group consisting of: aluminum oxide, cerium oxide, lanthanum oxide, magnesium oxide, praseodymium oxide, scandium oxide, silicon monoxide, thorium oxide, and yttrium oxide, as a main component.

According to the invention of Item (22), a similar effect as that of the invention of Item (20) or Item (21) is obtained.

(23) The antireflection coating of Item (22), wherein at least one of the high refractive index layers contains cerium oxide ($CeO_2$), as a main component.

According to the invention of Item (23), a similar effect as that of the invention of Item (22) is obtained.

(24) The antireflection coating of any one of Items (20)-(23), wherein the high refractive index layers each has a thickness of 30-70 nm.

According to the invention of Item (24), since the high refractive index layer has a small thickness of 30-70 nm, the occurrence of cracks in the high refractive index layer is steadily suppressed.

(25) The antireflection coating of any one of Items (20)-(24), wherein the first supplementary layer has a thickness of 5-30 nm.

According to the invention of Item (25), since the thickness of the supplementary layer is not more than 30 nm, degradation of the transmittance of light is minimized compared to when the thickness is more than 30 nm. Further, since the thickness of the supplementary layer is not less than 5 nm, the supplementary layer can be formed more uniformly compared to when the thickness is less than 5 nm.

(26) The antireflection coating of any one of Items (20)-(25), wherein the first supplementary layer exhibits a layer stress lower than a layer stress of the high refractive index layer.

According to the invention of Item (26), a similar effect as that of the invention of any one of Items (20)-(25) is obtained.

(27) The antireflection coating of any one of Items (20)-(26), wherein
the antireflection coating contains two low refractive index layers; and
the second supplementary layer is provided between the two low refractive index layers.

According to the invention of Item (27), the second supplementary layer is provided between the two low refractive index layers, which means that one high refractive index layer is separated into two layers and the thickness of each low refractive index layer is smaller compared to when no supplementary layer is used, whereby the occurrence of cracks in the low refractive index layer is steadily suppressed.

(28) The antireflection coating of Item (27), wherein
the antireflection coating contains two second supplementary layers; and
each of the two second supplementary layers is separately provided between the two low refractive index layers, wherein the two second supplementary layers are not provided adjacent to each other.

According to the invention of Item (28), a similar effect as that of the invention of Item (27) is obtained.

(29) The antireflection coating of Item (27) or Item (28), wherein
the second supplementary layer exhibits a layer stress reverse to a layer stress of each of the two low refractive index layers.

According to the invention of Item (29), since the supplementary layer exhibits a layer stress which is reverse to layer stresses of the low refractive index layers the layer stresses of the low refractive index layers sandwiching the supplementary layer are relaxed by the layer stress generated in the supplementary layer. Accordingly, the force to pull the neighboring layer generated by the layer stresses of the low refractive index layers is reduced, whereby occurrence of peel in the antireflection coating is suppressed

(30) The antireflection coating of any one of Items (20)-(29), wherein a ratio of a total thickness of the low refractive index layer being adjacent to the second supplementary layer to a thickness of the second supplementary layer is in the range of 2:1-4:1.

According to the invention of Item (30), since the ratio of a total thickness of the low refractive index layers to a thickness of the supplementary layer is in the range of 2:1-4:1, the occurrence of cracks in the low refractive index layer is more steadily suppressed, compared to when the ratio is less than 2:1 or when the ration is more than 4:1.

(31) The antireflection coating of any one of Items (20)-(30), wherein
the second supplementary layer exhibits a layer stress higher than a layer stress of the low refractive index layer.

According to the invention of Item (31), a similar effect as that of the invention of any one of Items (20)-(30) is obtained.

(32) The antireflection coating of any one of Items (20)-(31), wherein
on a body of the optical element, (i) the high refractive index layer, (ii) the first supplementary layer, (iii) the high refractive index layer, (iv) the low refractive index layer and (v) the second supplementary layer, are provided in that order; and
the two high refractive index layers have the same composition.

According to the invention of Item (32), a similar effect as that of the invention of any one of Items (20)-(31) is obtained.

(33) The antireflection coating of any one of Items (20)-(31), wherein
on a body of the optical element, (i) the high refractive index layer, (ii) the first supplementary layer, (iii) the high refractive index layer, (iv) the second supplementary layer and (v) the low refractive index layer, are provided in that order; and
the two high refractive index layers have the same composition.

According to the invention of Item (33), a similar effect as that of the invention of any one of Items (20)-(31) is obtained.

(34) The antireflection coating of any one of Items (20)-(31), wherein
on a body of the optical element, (i) the high refractive index layer, (ii) the first supplementary layer, (iii) the high refractive index layer, (iv) the low refractive index layer, (v) the second supplementary layer and (vi) the low refractive index layer, are provided in that order;
the two high refractive index layers have the same composition; and
the two low refractive index layers have the same composition.

According to the invention of Item (34), a similar effect as that of the invention of any one of Items (20)-(31) is obtained.

(35) The antireflection coating of any one of Items (1)-(34), wherein
the low refractive-index layer and the supplementary layer contain the same materials, however, a composition of the low refractive index layer is different from a composition of the supplementary layer.

According to the invention of Item (35), a similar effect as that of the invention of any one of Items (1)-(34) is obtained.
(36) The antireflection coating of any one of Items (1)-(35), wherein
the high refractive index layer contains a high refractive index material; and
the low refractive index layer and the supplementary layer each contains a low refractive index material.

According to the invention of Item (36), a similar effect as that of the invention of any one of Items (1)-(35) is obtained.

Examples of a high refractive index material include: aluminum oxide, cerium oxide, lanthanum oxide, magnesium oxide, praseodymium oxide, scandium oxide, silicon monoxide, thorium oxide, and yttrium oxide, and as a low refractive index material, silicone dioxide is listed.
(37) The antireflection coating of Item (36), wherein the low refractive index layer contains silicone dioxide, as a main component.

According to the invention of Item (37), a similar effect as that of the invention of Item (36) is obtained.
(38) An optical element containing a body which passes through at least two wavelengths of light in the wavelength range of 1300-1600 nm and an antireflection coating of any one of Items (1)-(37), provided on an optical surface of the body.

According to the invention of Item (38), a similar effect as that of the invention of any one of Items (1)-(37) is obtained.
(39). The optical element of Item (38), wherein a diffraction structure is provided on the optical surface of the body.

According to the invention of Item (39), since a diffraction structure is provided on the optical surface of the body, the communication of signals using a plurality of wavelengths of light is accurately carried out, while the production cost is lowered compared to when multiple layers for wavelength separation are formed.
(40) The optical element of Item (38) or Item (39), wherein the body contains a plastic material.

According to the invention of Item (40), even when the body of the optical element contains a plastic material, a similar effect as that of the invention of Item (38) or Item (39) is obtained.
(41) An optical transceiver module comprising:
a light emitting element and a light receiving element both of which are provided close to an end surface of an optical fiber used for duplex transmission of optical signals; and
the optical element of any one of Items (38)-(40), provided between the optical fiber and the light emitting element or the light receiving element.

According to the invention of Item (41), a similar effect as that of the invention of any one of Items (38)-(40) is obtained.

In the present invention, the layer stress of each material used for the antireflection coating is independently determined by depositing each material on a thin flexible silica substrate which becomes deformed. The deformation is then measured and the value of stress necessary to cause it is calculated according to the methods reported in the following literature: R. W. Hoffman (1966), The mechanical properties of thin condensed films in "Physics of Thin Films" ed G. Hass and R. E. Thun, 3, 211-73; R. W. Hoffman (1976), Stress in thin film: the relevance of grain boundaries and impurities, Thin Solid Films, 34, 185-90; and A. E. Ennos (1966), Stress developed in optical coating film coatings, Appl. Opt. 5, 51-61.

Some preferred embodiments of the present invention are described below with reference to the drawings.

FIG. 1 is a diagram of the outline configuration of the optical transceiver module according to the present invention.

As is shown in this figure, optical transceiver module 1 is provided with cylindrical case 10, optical fiber supporting body (hereinafter referred to as supporting body) 2 and substrate 3 are placed inside case 10 in a mutually opposing state.

Supporting body 2 is a hollow cylindrical member, and holds inside of it one end part 4a of optical fiber 4.

End surface 4b of one end part 4a of optical fiber 4 is opposing substrate 3, and the other end (not shown in the figure) is connected to an optical communication system (not shown in the figure) Because of this, optical fiber 4 can transmit optical signals with other optical transceiver modules via said optical communication system.

Substrate 3 is provided with light receiving element 30 and light emitting element 31 of the present invention towards the side of supporting body 2.

In the present preferred embodiment, a photodiode is used as light receiving element 30, and a semiconductor laser is used as light emitting element 31. Lens 32 made of glass is opposite the light emitting surface of light emitting element 31, and this light emitting element 31 and lens 32 are assembled in an integrated manner thereby constituting light emitting element unit 33.

These light receiving element 30 and light emitting element 31 can transmit or receive electrical signal with an external terminal equipment (not shown in the figure) via connector 34. Further, the wavelengths $\lambda_1$ and $\lambda_2$ used by light receiving element 30 and light emitting element 31 are respectively within the wavelength range of 1300-1600 nm, and in the present preferred embodiment $\lambda_1$=1490 nm and $\lambda_2$=1310 nm.

Between above supporting body 2 and substrate 3, placed is lens 5 as the optical element of the present invention.

Lens 5 is provided with body 50 made of plastic. Body 50 is an optical element of the present invention, and has optical surface 50a on the side of supporting body 2, that is, the right side in FIG. 1, and optical surface 50b on the side of substrate 3.

Figure 2A:
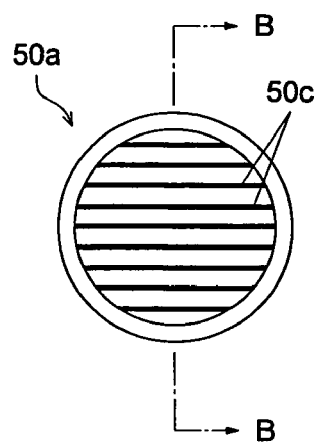
FIG. 2(a) is a front view of an optical element having a diffraction grating.
Figure 2B:
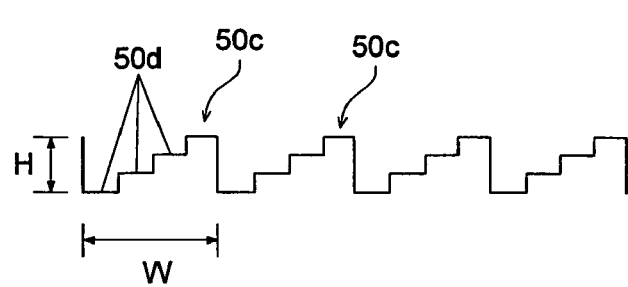
FIG. 2(b) is a B-B cross section of the surface of the optical element viewed from the direction of arrow A.

Optical surface 50a, as shown in FIGS. 2(a) and 2(b), has a diffraction grating 50c. Diffraction grating 50c is formed of a plurality of step gratings 50d. These step gratings 50d are placed so that they extend along the horizontal direction in optical surface 50a and also are repeated periodically in the vertical direction. Further, in the present preferred embodiment, the number of steps is four in each repeat unit of step gratings 50d. In addition, as is shown in FIG. 2(b), for example, each step grating 50d has an overall height H of 15 μm and an overall width W of 38 μm. Further, in the present preferred embodiment, step gratings 50d are formed in a projecting state from the reference surface of optical surface 50a, however, it is also possible to form them in a hollow state.

The plastic used for body 50 is preferably a cyclic olefin copolymer expressed by the following Formula (1). Examples of a copolymer that can be used include various known copolymers such as a random copolymer, a block copolymer, an alternating copolymer, however, preferable is a random copolymer.

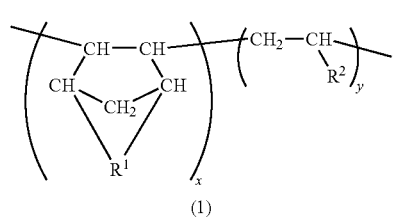

Formula (1)

(1)

R[1] in Formula (1) represents a divalent hydrocarbon group having 2-20 carbon atoms, more preferably 2-12 carbon atoms. R[1] is still more preferably a divalent group expressed by the following Formula (2). Further, it is possible to use only one type of structure of R[1] or to use simultaneously two or more types of structures. In addition, p in the Chemical Formula (2) is an integer of 0-2, and preferably 0 or 1.

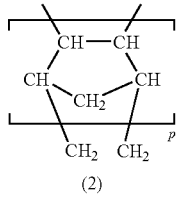

Formula (2)

(2)

R[2] represents a hydrogen atom or a monovalent hydrocarbon group having 1-5 carbon atoms. Examples of a group represented by R[2] include: a hydrogen atom, a methyl group, an ethyl group, a n-propyl group, an i-propyl group, a n-butyl group, a 2-methylpropyl group, however, preferable is a hydrogen atom or a methyl group, and most preferable is a hydrogen atom.

x and y represent copolymer ratios, and the x/y value is preferably 5/95 or more but 95/5 or less.

As such a plastic, in the present preferred embodiment, APEL® manufactured by Mitsui Chemicals Inc. is used.

Antireflection coating 6 is provided on optical surface 50b of above body 50.

Figure 3:
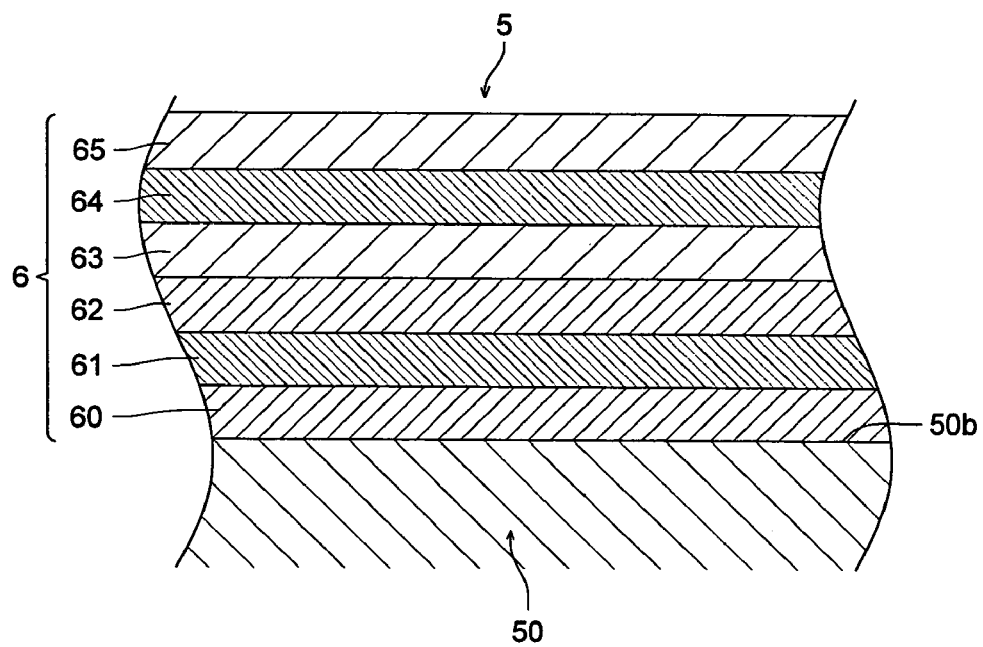
FIG. 3 illustrates the cross-section of a typical example of an antireflection coating of the present invention.
Figure 4:
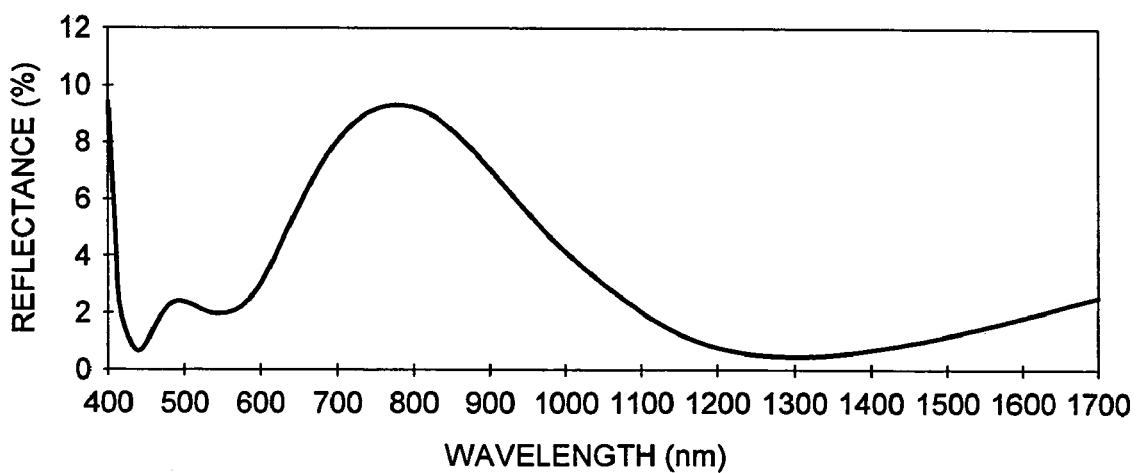
FIG. 4 is a reflectance spectrum of the lens of Example 1.
Figure 5:
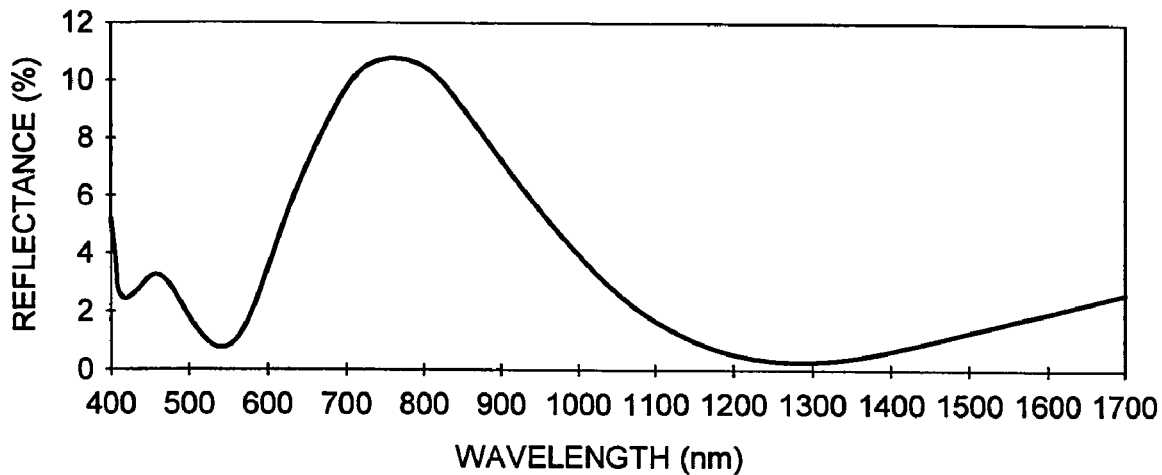
FIG. 5 is a reflectance spectrum of the lens of Example 3.
Figure 6:
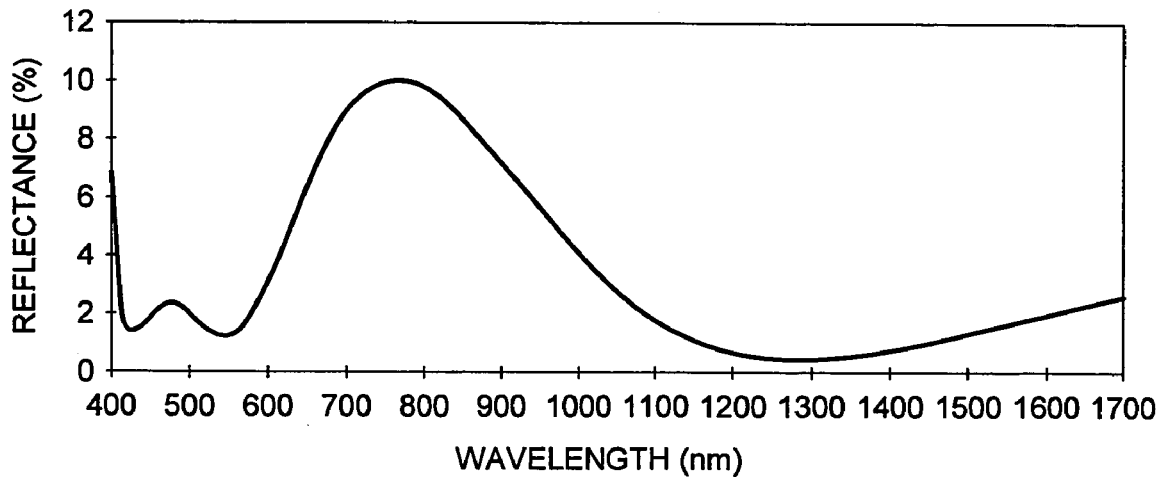
FIG. 6 is a reflectance spectrum of the lens of Example 3.
Figure 7:
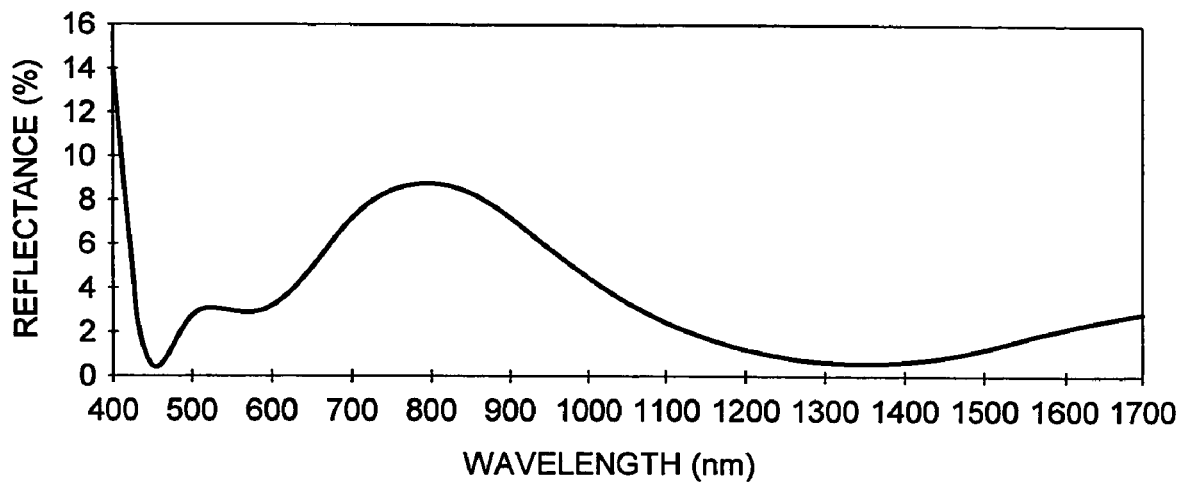
FIG. 7 is a reflectance spectrum of the lens of Example 4.
Figure 8:
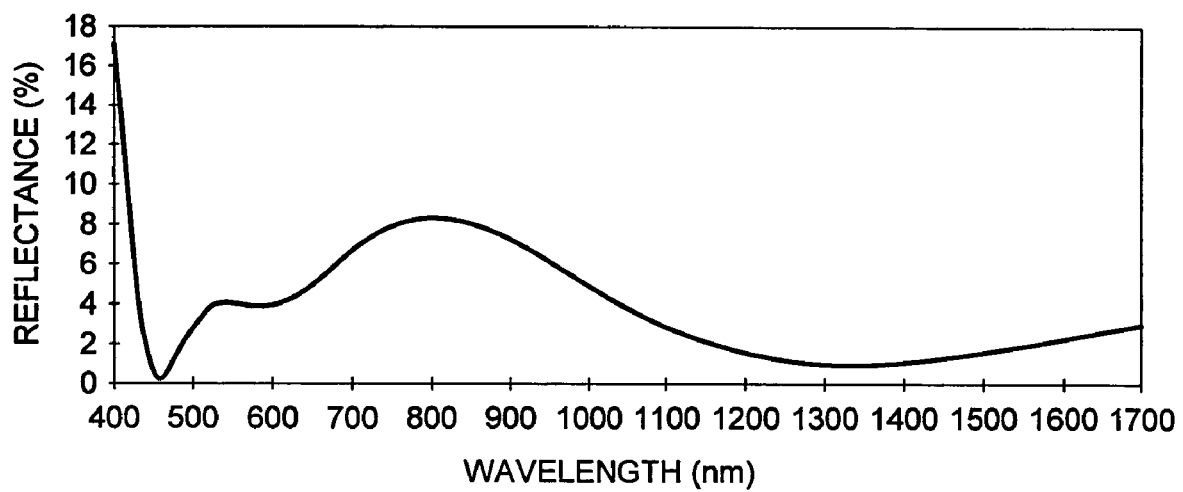
FIG. 8 is a reflectance spectrum of the lens of Example 5.
Figure 9:
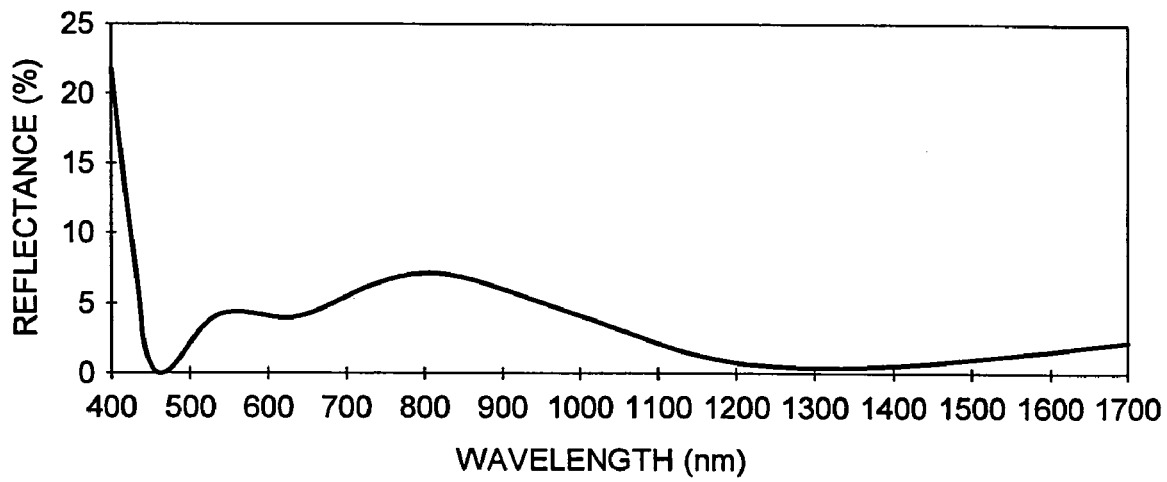
FIG. 9 is a reflectance spectrum of the lens of Example 6.
Figure 10:
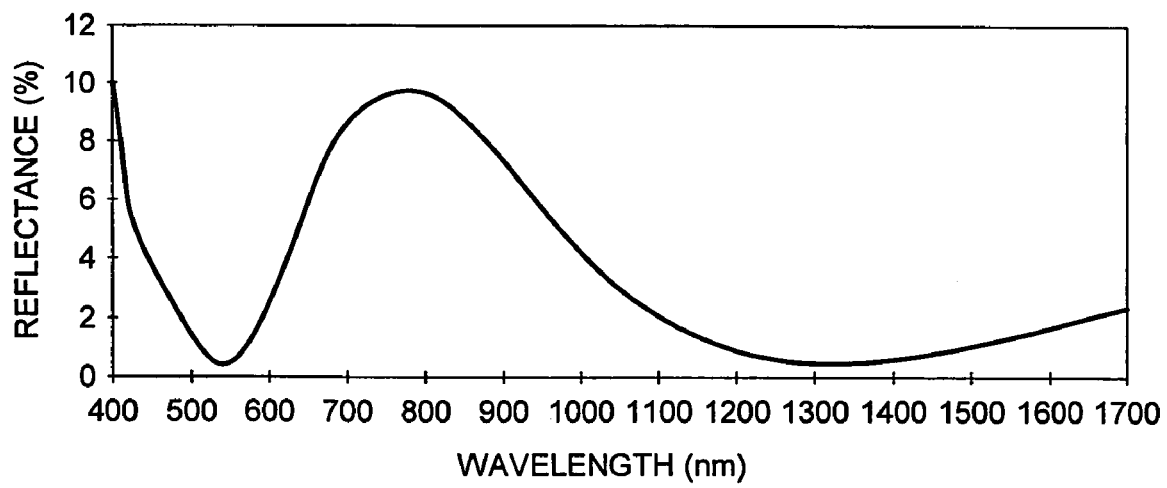
FIG. 10 is a reflectance spectrum of the lens of Example 7.
Figure 11:
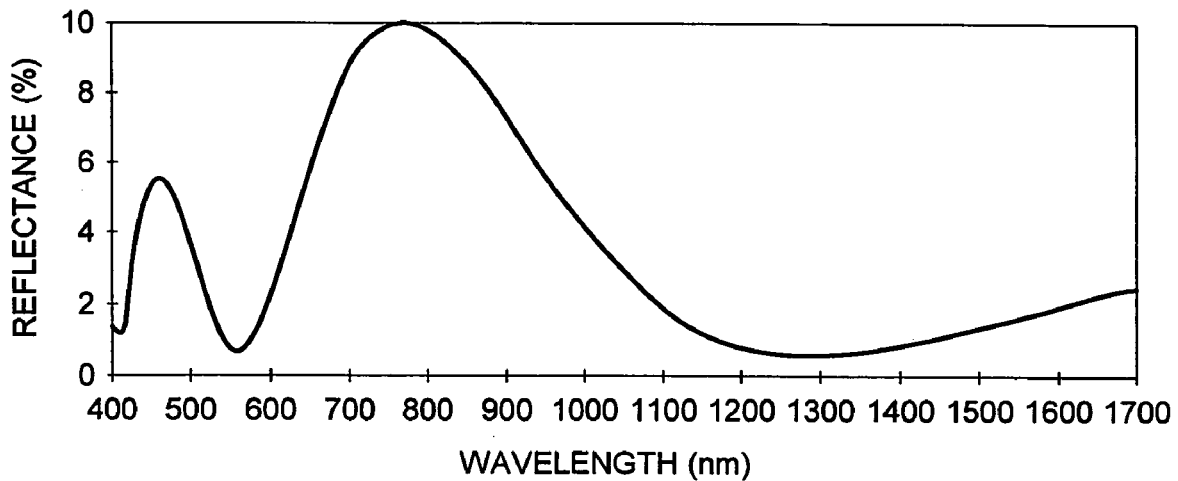
FIG. 11 is a reflectance spectrum of the lens of Example 8.
Figure 12:
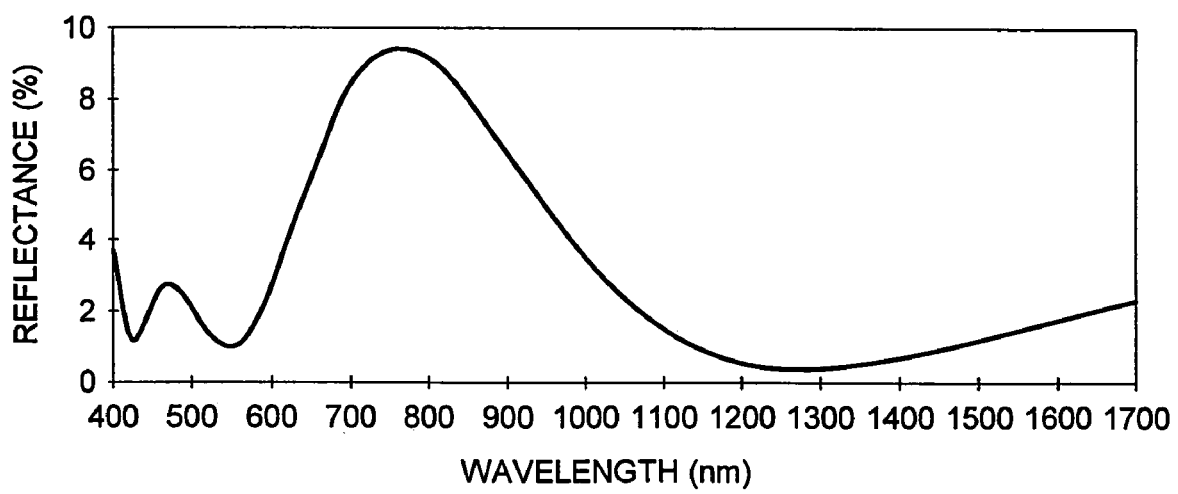
FIG. 12 is a reflectance spectrum of the lens of Example 9.
Figure 13:
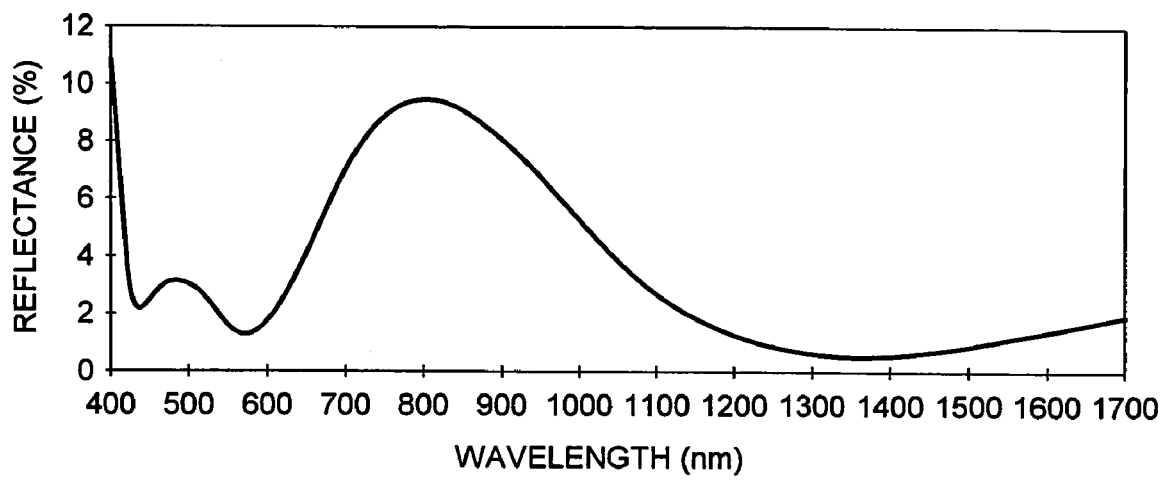
FIG. 13 is a reflectance spectrum of the lens of Example 10.
Figure 14:
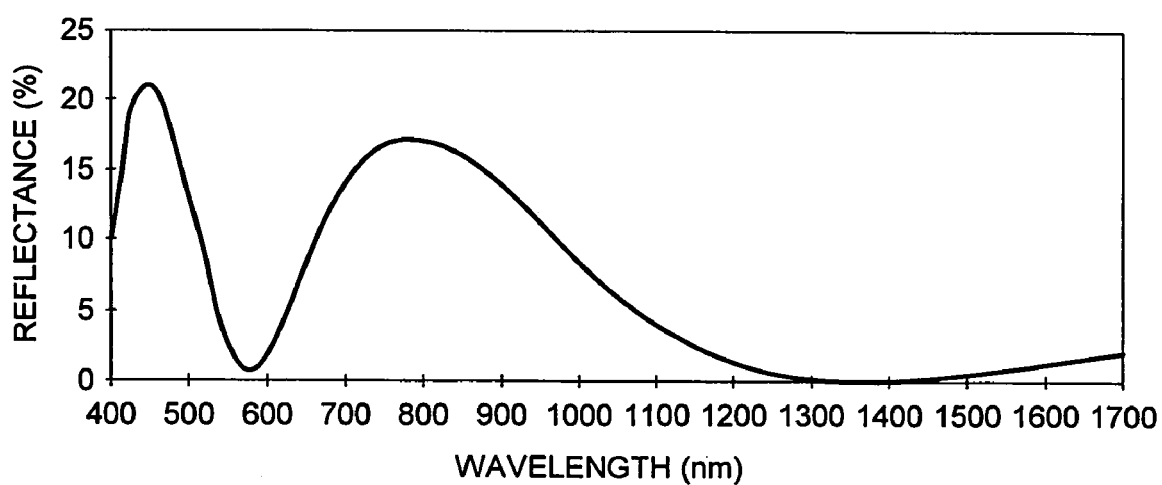
FIG. 14 is a reflectance spectrum of the lens of Example 11.
Figure 15:
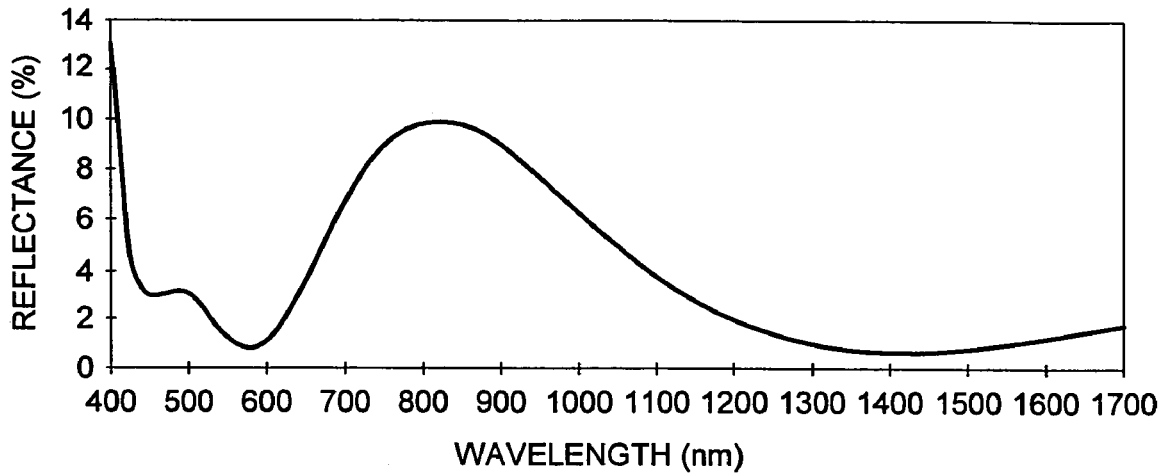
FIG. 15 is a reflectance spectrum of the lens of Example 12.
Figure 16:
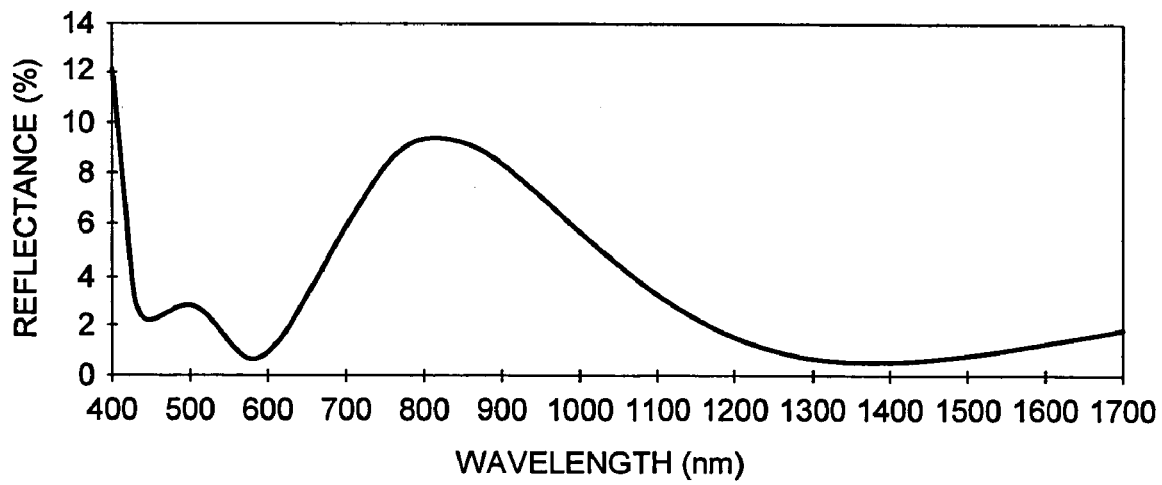
FIG. 16 is a reflectance spectrum of the lens of Example 13.
Figure 17:
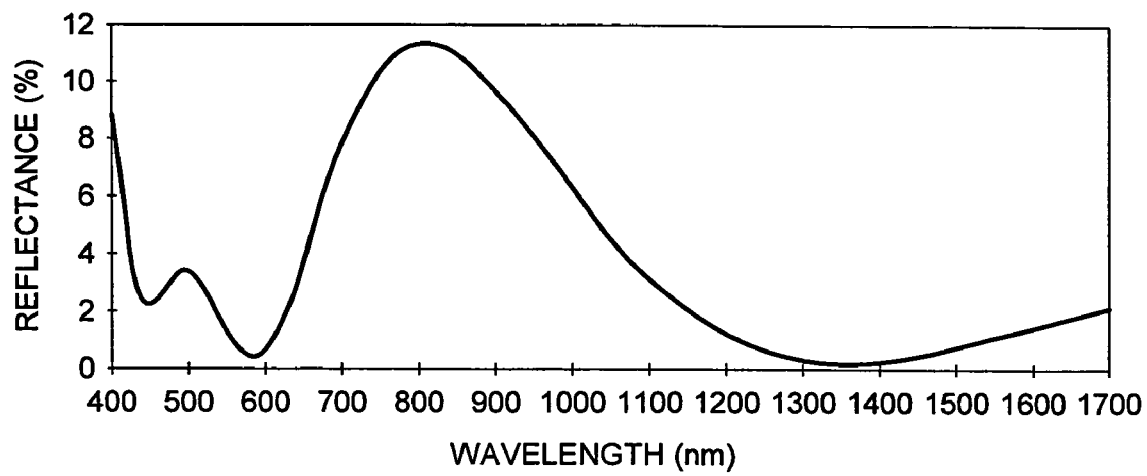
FIG. 17 is a reflectance spectrum of the lens of Comparative 1.
Figure 18:
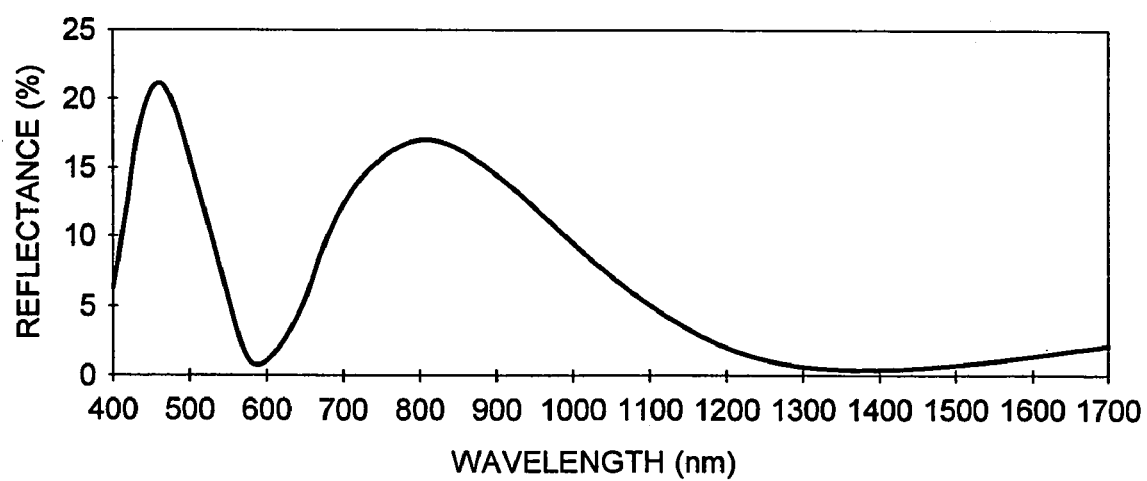
FIG. 18 is a reflectance spectrum of the lens of Comparative 2.

Antireflection coating 6, as is shown in FIG. 3, contains six layers, namely, from nearest to body 50, high refractive index layer 60, supplementary layer 61, high refractive index layer 62, low refractive index layer 63, supplementary layer 64, and low refractive index layer 65, in that order.

High refractive index layers 60 and 62 are formed using a high refractive index material to have a thickness of 30-70 nm, and the refractive index of this high refractive index material is 1.8 or less when measured at a wavelength of 1450 nm. Examples of a high refractive index material include a single compound or a mixed compound having the following materials as its main component, such as aluminum oxide, cerium oxide, lanthanum oxide, magnesium oxide, praseodymium oxide, scandium oxide, silicon monoxide, thorium oxide, and yttrium oxide. In the present invention preferable is a compound having cerium oxide as its main component.

Low refractive index layers 63 and 65 contain low refractive index materials so that their total thickness ratio with respect to supplementary layer 64, that is, the ratio of the sum of the thickness of low refractive index layer 63 and low refractive index layer 65 to the thickness of supplementary layer 64 is in the range of 2:1-4:1. The refractive index of the low refractive index material is lower than the refractive index of the high refractive index material, and because of this, the refractive indices of low refractive index layers 63 and 65 are lower than the refractive indices of high refractive index layers 60 and 62. A compound or mixture having silicon dioxide as its main component is preferably used as the low refractive index material for low refractive index layers 63 and 65 in the present invention. Further, it is preferable that the thickness of low refractive index layer 65 at the topmost surface layer of antireflection coating 6 is equal to or less than 145 nm.

Since supplementary layers 61 and 64 have different compositions from those of high refractive index layers 60 and 62, and of low refractive index layers 63 and 65, they have different layer stresses. In more detail, the layer stress of supplementary layer 61 is lower than those of high refractive index layers 60 and 62, and the layer stress of supplementary layer 64 is higher than those of low refractive index layers 63 and 65. Further, the layer stress is expressed as a positive value when the stress is a tension and a negative value when the stress is compression.

These supplementary layers 61 and 64 are formed to have thicknesses of 5-30 nm using a compound or a mixed compound containing silicon dioxide as its main component. Further, supplementary layers 61 and 64 may also be formed using a compound or a mixed compound containing cerium oxide as its main component.

Such supplementary layers 61 and 64 may be formed by means of, for example, an vacuum deposition method, while controlling the supply rate of gases such as oxygen, the evaporation rate, and the heating temperature. For example, when forming supplementary layer 64 exhibiting a higher layer stress than those of low refractive index layers 63 and 65 using a material having the same main component as those of low refractive index layers 63 and 65, the oxygen supply rate may be increased, the evaporation rate may be lowered, or the heating temperature may be lowered. Alternatively, the layer stress of supplementary layer 64 may be made higher than the layer stresses of low refractive index layers 63 and 65 by using a material containing a different main component from those of low refractive index layers 63 and 65. Further, when forming supplementary layer 61 exhibiting a lower layer stress than those of high refractive index layers 60 and 62, a material containing a different main component from those of high refractive index layers 60 and 62 may be used, the oxygen supply rate may be increased, the evaporation rate may be lowered, or the heating temperature may be lowered.

Further, the method to form supplementary layers 61 and 64 is not limited to the vacuum evaporation method, but an ion assisted deposition method or an ion plating method may also be used.

In the next, the signal reception operation of above optical transceiver module 1 will be described.

When light of wavelength $\lambda_1$ is emitted from end surface 4b of optical fiber 4, the light is refracted by optical surface 50a of lens 5 to be guided to light receiving element 30.

At this time, since antireflection coating 6 having high refractive index layers 60 and 62, and low refractive index layers 63 and 65 is provided on optical surface 50b of lens 5, the reflection of the light of wavelength $\lambda_1$ is minimized.

On the other hand, since supplementary layers 61 and 64 having different layer stresses from those of high refractive index layers 60 and 62, or those of low refractive index layers 63 and 65 are provided adjacent to and in contact with high refractive index layers 60 and 62, or low refractive index layers 63 and 65, the thicknesses of high refractive index layers 60 and 62, and low refractive index layers 63 and 65 become smaller, compared to the case where there is no supplementary layer, that is, the case where the antireflection coating is formed by simply applying the conventional antireflection coating for light of low wavelengths of about 650 nm or 780 nm to an antireflection coating for the wavelength range of 1300-1600 nm (hereinafter referred to as a 2-layer shift coating). In addition, since supplementary layers 61 and 64 are provided between high refractive index layers 60 and 62, or between low refractive index layers 63 and 65, one single high refractive index layer and one single low refractive index layer each is divided into two layers, due to the presence of supplementary layers 61 and 64, and the thicknesses of high refractive index layers 60 and 62 and of the thicknesses of low refractive index layers 63 and 65 becomes still smaller, compared to when supplementary layers 61 and 64 are not provided. Specifically, the thicknesses of high refractive index layers 60 and 62 are decreased to as small as 30-70 nm. Further, since supplementary layer 64 and low refractive index layers 63 and 65 that are adjacent to each other are formed by using low refractive index materials, supplementary layer 64 and the low refractive index layers 63 and 65 will have similar reflectivity characteristics. As a result, the thicknesses of the low refractive index layers 63 and 65 become still smaller, compared to when the supplementary layer 64 is not provided, because a part of the antireflection function of low reflective index layers 63 and 65 is taken over by supplementary layer 64. As a result, the generation of cracks is suppressed even when the shape of lens 5 changes due to changes in the temperature and humidity, since the distortion due to the internal stresses is suppressed, in high refractive index layers 60 and 62, and in low refractive index layers 63 and 65. In addition, since the ratio of the total thickness of low refractive index layers 63 and 65 to the thickness of supplementary layer 64 is 2-4, the occurrence of cracks in low refractive index layers 63 and 65 is more steadily suppressed compared to when the thickness ratio is less than 2:1 or is more than 4:1.

The reception operation is completed by transmitting an electrical signal proportional to the amount of light received by light receiving element 30 to the external terminal equipment via connector 34.

The transmission operation of the above optical transceiver module 1 will be described here.

When an electrical signal is sent from an external terminal equipment via connector 34 to this module, light of wavelength $\lambda_2$ is emitted from light emitting element 33. The light is refracted by lens 5 and guided to end surface 4b of optical fiber 4. At this time, reflection of the light of wavelength $\lambda_2$ is minimized in the similar manner as above.

The transmission operation is completed by transmitting the incident light to said other optical transceiver module through optical fiber 4 and the optical communication system.

According to the above optical transceiver module 1, the reflection of light of wavelengths $\lambda_1$ and $\lambda_2$ are minimized and decrease in the transmittance is avoided, as a result, occurrence of errors in the signals is also minimized. Also, since the generation of cracks can be minimized even when the shape of lens 5 changes, degradation in the durability of lens 5 is avoided by providing antireflection coating 6. As described above, a higher durability of the antireflection coating compared to that of the 2-layer shift coating has been attained without reducing the transmittance of light.

Since diffraction structure 50c is provided in optical surface 50a, communication of signals using light of wavelengths $\lambda_1$ and $\lambda_2$ is accurately carry out.

In the above embodiment, antireflection coating 6 having a 6-layer configuration is explained, however, other configurations of layers such as a 4-layer configuration are also employable, provided that supplementary layer 61 is provided in between two high refractive index layers, or supplementary layer 64 is provided adjacent to a low refractive index layer. Further, antireflection coating 6 is explained to have supplementary layers 61 and 64, however, the antireflection coating of the present invention may only have one of supplementary layers 61 and 64. When only supplementary layer 64 is provided, the high refractive index layer is preferably formed with a thickness of 70 nm or less using a high refractive index material having a refractive index of more than 1.8 at a wavelength of 1450 nm. As such high refractive index material, materials having one of the following compound as a main component are usable, for example, hafnium dioxide, tantalum pentaoxide (tantalum (V) oxide), titanium dioxide and zirconium dioxide. Specifically, preferable is OA-600® (produced by CANON OPTRON Inc.) which is a mixture of tantalum pentaoxide and titanium dioxide.

In the above embodiment, antireflection coating 6 contains only one supplementary layer provided between the low refractive index layers, however, the antireflection coating of the present invention may have two or more supplementary layers which are separately provided between the low refractive index layers.

Further, the layer stress of supplementary layer 64 provided between two low refractive index layers 63 and 65 is explained as higher than those of low refractive index layers 63 and 65 in the above description. When the layer stresses of low refractive index layers 63 and 65 are the compressive stresses (negative values), it is also possible that the layer stress of supplementary layer 64 is the tensile stress (positive value), that is, it is reverse to those of low refractive index layers 63 and 65. In this case, since the layer stresses generated in two low refractive index layers 63 and 65 on both sides of supplementary layer 64 are reduced due to the layer stress generated in supplementary layer 64, the tensile stress in high refractive index layer 62 applied by the neighboring low refractive index layers 63 and 65 is also reduced. Therefore, even when the total thickness of the two low refractive index layers 63 and 65 is large, it is possible to prevent the peeling of layers in antireflection coating 6.

As the plastic material used for body 50, the material disclosed in JP-A No. 2003-321518, for example, is also employable, besides the compound represented by the above Formula (1).

Although it was explained that antireflection coating 6 is provided on optical surface 50b, it is also possible to provide it on optical surface 50a, or to provide it on both optical surfaces 50a and 50b.

Other lens, for example, a splitter lens may be employed as an optical element of the present invention, besides lens 5.

EXAMPLE 1

The present invention is described in further concrete details in the following by using examples and comparative examples.

<Configuration of Optical Element>

Examples 1-13 of the lenses provided with the antireflection coatings having the layer constructions shown in Tables 1-13 on optical surface 50b of body 50 were prepared, as the examples of the lens described in the above preferred embodiment. Also, Comparative Examples 1 and 2 of lenses provided with the antireflection coatings having the layer constructions shown in Tables 14 and 15 on optical surface 50b of body 50 were prepared. In Examples 1-9, the 3rd layer is a supplementary layer, in Example 10, the 2nd layer and the 5th layer are supplementary layers, in Example 11, the 2nd layer is the supplementary layer, in Example 12, the 2nd layer and the 4th layer are supplementary layers, and in Comparative Example 1, the 1st layer and the 4th layer are supplementary layers. In addition, the antireflection coating shown in Table 14 is a 2-layer shift film.

TABLE 1

| Layer | Material | Refractive Index | Thickness (nm) | Layer stress (MPa) |
|---|---|---|---|---|
| Medium | Air | 1.00 | | |
| 1 | $SiO_2$ | 1.46 | 255 | −100 |
| 2 | $CeO_2$ | 1.75 | 62.2 | 40 |
| 3 | $SiO_2$ | 1.46 | 15 | −100 |
| 4 | $CeO_2$ | 1.75 | 50 | 40 |
| Body | APEL | 1.53 | | |

Reference wavelength: 1450 nm

TABLE 2

| Layer | Material | Refractive Index | Thickness (nm) | Layer stress (MPa) |
|---|---|---|---|---|
| Medium | Air | 1.00 | | |
| 1 | $SiO_2$ | 1.46 | 255 | −100 |
| 2 | $CeO_2$ | 1.75 | 62.2 | 40 |
| 3 | $SiO_2$ | 1.46 | 5 | −100 |
| 4 | $CeO_2$ | 1.75 | 50 | 40 |
| Body | APEL | 1.53 | | |

Reference wavelength: 1450 nm

TABLE 3

| Layer | Material | Refractive Index | Thickness (nm) | Layer stress (MPa) |
|---|---|---|---|---|
| Medium | Air | 1.00 | | |
| 1 | $SiO_2$ | 1.46 | 255 | −100 |
| 2 | $CeO_2$ | 1.75 | 62.2 | 40 |
| 3 | $SiO_2$ | 1.46 | 10 | −100 |
| 4 | $CeO_2$ | 1.75 | 50 | 40 |
| Body | APEL | 1.53 | | |

Reference wavelength: 1450 nm

TABLE 4

| Layer | Material | Refractive Index | Thickness (nm) | Layer stress (MPa) |
|---|---|---|---|---|
| Medium | Air | 1.00 | | |
| 1 | $SiO_2$ | 1.46 | 255 | −100 |
| 2 | $CeO_2$ | 1.75 | 62.2 | 40 |
| 3 | $SiO_2$ | 1.46 | 20 | −100 |
| 4 | $CeO_2$ | 1.75 | 50 | 40 |
| Body | APEL | 1.53 | | |

Reference wavelength: 1450 nm

TABLE 5

| Layer | Material | Refractive Index | Thickness (nm) | Layer stress (MPa) |
|---|---|---|---|---|
| Medium | Air | 1.00 | | |
| 1 | $SiO_2$ | 1.46 | 255 | −100 |
| 2 | $CeO_2$ | 1.75 | 62.2 | 40 |
| 3 | $SiO_2$ | 1.46 | 25 | −100 |
| 4 | $CeO_2$ | 1.75 | 50 | 40 |
| Body | APEL | 1.53 | | |

Reference wavelength: 1450 nm

TABLE 6

| Layer | Material | Refractive Index | Thickness (nm) | Layer stress (MPa) |
|---|---|---|---|---|
| Medium | Air | 1.00 | | |
| 1 | $SiO_2$ | 1.46 | 255 | −100 |
| 2 | $CeO_2$ | 1.75 | 62.2 | 40 |
| 3 | $SiO_2$ | 1.46 | 30 | −100 |
| 4 | $CeO_2$ | 1.75 | 50 | 40 |
| Body | APEL | 1.53 | | |

Reference wavelength: 1450 nm

TABLE 7

| Layer | Material | Refractive Index | Thickness (nm) | Layer stress (MPa) |
|---|---|---|---|---|
| Medium | Air | 1.00 | | |
| 1 | $SiO_2$ | 1.46 | 255 | −100 |
| 2 | $CeO_2$ | 1.75 | 70 | 40 |
| 3 | $SiO_2$ | 1.46 | 15 | −100 |
| 4 | $CeO_2$ | 1.75 | 30 | 40 |
| Body | APEL | 1.53 | | |

Reference wavelength: 1450 nm

TABLE 8

| Layer | Material | Refractive Index | Thickness (nm) | Layer stress (MPa) |
|---|---|---|---|---|
| Medium | Air | 1.00 | | |
| 1 | $SiO_2$ | 1.46 | 255 | −100 |
| 2 | $CeO_2$ | 1.75 | 30 | 40 |
| 3 | $SiO_2$ | 1.46 | 15 | −100 |
| 4 | $CeO_2$ | 1.75 | 70 | 40 |
| Body | APEL | 1.53 | | |

Reference wavelength: 1450 nm

TABLE 9

| Layer | Material | Refractive Index | Thickness (nm) | Layer stress (MPa) |
|---|---|---|---|---|
| Medium | Air | 1.00 | | |
| 1 | $SiO_2$ | 1.46 | 255 | −100 |
| 2 | $CeO_2$ | 1.75 | 50 | 40 |
| 3 | $SiO_2$ | 1.46 | 15 | −100 |
| 4 | $CeO_2$ | 1.75 | 50 | 40 |
| Body | APEL | 1.53 | | |

Reference wavelength: 1450 nm

TABLE 10

| Layer | Material | Amount of gas introduced | Refractive Index | Thickness (nm) | Layer stress (MPa) |
|---|---|---|---|---|---|
| Medium | Air | | 1.00 | | |
| 1 | $SiO_2$ | Small volume of $O_2$ | 1.46 | 100 | −100 |
| 2 | $SiO_2$ | Large volume of $O_2$ | 1.44 | 60 | −10 |
| 3 | $SiO_2$ | Small volume of $O_2$ | 1.46 | 110 | −100 |
| 4 | $CeO_2$ | | 1.75 | 55 | 40 |
| 5 | $SiO_2$ | Small volume of $O_2$ | 1.46 | 15 | −100 |

TABLE 10-continued

| Layer | Material | Amount of gas introduced | Refractive Index | Thickness (nm) | Layer stress (MPa) |
|---|---|---|---|---|---|
| 6 | CeO$_2$ | | 1.75 | 50 | 40 |
| Body | APEL | | 1.53 | | |

Reference wavelength: 1450 nm

TABLE 11

| Layer | Material | Amount of gas introduced | Refractive Index | Thickness (nm) | Layer stress (MPa) |
|---|---|---|---|---|---|
| Medium | Air | | 1.00 | | |
| 1 | SiO$_2$ | Small volume of O$_2$ | 1.46 | 100 | −100 |
| 2 | SiO$_2$ | Large volume of O$_2$ | 1.44 | 75 | −10 |
| 3 | SiO$_2$ | Small volume of O$_2$ | 1.46 | 110 | −100 |
| 4 | OA600 | | 1.99 | 66 | +10 |
| Body | APEL | | 1.53 | | |

Reference wavelength: 1450 nm

TABLE 12

| Layer | Material | Amount of gas introduced | Refractive Index | Thickness (nm) | Layer stress (MPa) |
|---|---|---|---|---|---|
| Medium | Air | | 1.00 | | |
| 1 | SiO$_2$ | Small volume of O$_2$ | 1.46 | 210 | −100 |
| 2 | SiO$_2$ | Large volume of O$_2$ | 1.44 | 70 | −10 |
| 3 | CeO$_2$ | | 1.75 | 55 | 40 |
| 4 | SiO$_2$ | Small volume of O$_2$ | 1.46 | 15 | −100 |
| 5 | CeO$_2$ | | 1.75 | 50 | 40 |
| Body | APEL | | 1.53 | | |

Reference wavelength: 1450 nm

TABLE 13

| Layer | Material | Amount of gas introduced | Refractive Index | Thickness (nm) | Layer stress (MPa) |
|---|---|---|---|---|---|
| Medium | Air | | 1.00 | | |
| 1 | SiO$_2$ | Large volume of O$_2$ | 1.44 | 60 | −10 |
| 2 | SiO$_2$ | Small volume of O$_2$ | 1.46 | 220 | −100 |
| 3 | CeO$_2$ | | 1.75 | 55 | 40 |
| 4 | SiO$_2$ | Small volume of O$_2$ | 1.46 | 15 | −100 |
| 5 | CeO$_2$ | | 1.75 | 50 | 40 |
| Body | APEL | | 1.53 | | |

Reference wavelength: 1450 nm

TABLE 14

| Layer | Material | Refractive Index | Thickness (nm) | Layer stress (MPa) |
|---|---|---|---|---|
| Medium | Air | 1.00 | | |
| 1 | SiO$_2$ | 1.46 | 265 | −100 |

TABLE 14-continued

| Layer | Material | Refractive Index | Thickness (nm) | Layer stress (MPa) |
|---|---|---|---|---|
| 2 | CeO$_2$ | 1.75 | 126.56 | 40 |
| Body | APEL | 1.53 | | |

Reference wavelength: 1450 nm

TABLE 15

| Layer | Material | Refractive Index | Thickness (nm) | Layer stress (MPa) |
|---|---|---|---|---|
| Medium | Air | 1.00 | | |
| 1 | SiO$_2$ | 1.46 | 300 | −100 |
| 2 | OA600 | 1.99 | 66 | +10 |
| Body | APEL | 1.53 | | |

Reference wavelength: 1450 nm

<Evaluation of Antireflection Characteristics>

The results shown in FIGS. 4-18 were obtained upon measuring the antireflection characteristics of the lenses formed according to Examples 1-13 and the Comparative Examples 1 and 2. From these results it was found that in all the lenses satisfactory transmittance was obtained for light in the wavelength range of 1300-1600 nm.

<Evaluation of Durability>

Further, the results of FIG. 19 were obtained when the presence of cracks was checked after the lenses of Examples 1-13 and the Comparative Examples 1 and 2 were exposed to high temperature conditions of 85° C., 95° C., and 100° C. for 2000 hours, under high temperature and high humidity conditions of 85° C. and 85% Rh for 2000 hours, and under heat cycle conditions. Here, the heat cycle conditions used were that of −40° C. for 1 hour, 5 minutes at room temperature and 85° C. for 1 hour which was repeated for 800 cycles in this sequence. From these results, it was found that the durability of the lenses of Examples 1-13 was higher compared to the Comparative Examples 1 and 2. Further, in FIG. 19, "A" indicates that no cracks were generated, "B" indicates that very slight and minute cracks that cause no problem during actual use were generated, and "Crack" indicates that cracks that cause problems during actual use were generated.

<Overall Evaluation>

From the above description, it was found that the lenses of the Examples 1-13 were suitable for use as the lens of optical transceiver module 1 without reducing the light transmittance while improving the durability.

On the other hand, it was found that the durability of the lenses of Comparative Examples 1 and 2 using the conventional 2-layer shift films, was lower and thus they were not suitable for use as the lens of the optical transceiver module 1.

EXAMPLE 2

The present invention will be described in further details in the following by using Examples.

<Construction of Optical Element>

As the Examples 14-16 of the lens in the above embodiment, antireflection coatings with the layer constitutions shown in Tables 16 to 18 below were provided on optical surface 50b of body 50. In these examples, the 2nd layer in Example 14 is a supplementary layer, the 2nd layer and the 5th layer in Example 15 are supplementary layers, and the 2nd layer, the 4th layer and the 7th layer in Example 16 are supplementary layers.

TABLE 16

| Layer | Material | Refractive Index | Thickness (nm) | Layer stress (MPa) |
|---|---|---|---|---|
| Medium | Air | 1.00 | | |
| 1 | SiO$_2$ | 1.46 | 110 | −100 |
| 2 | CeO$_2$ | 1.44 | 75 | 40 |
| 4 | SiO$_2$ | 1.46 | 110 | −100 |
| 5 | OA600 | 1.99 | 66 | 10 |
| Body | APEL | 1.53 | | |

Reference wavelength: 1450 nm

TABLE 17

| Layer | Material | Refractive Index | Thickness (nm) | Layer stress (MPa) |
|---|---|---|---|---|
| Medium | Air | 1.00 | | |
| 1 | SiO$_2$ | 1.46 | 205 | −100 |
| 2 | CeO$_2$ | 1.75 | 15 | 40 |
| 3 | SiO$_2$ | 1.46 | 90 | −100 |
| 4 | CeO$_2$ | 1.75 | 62.5 | 40 |
| 5 | SiO$_2$ | 1.46 | 15 | −100 |
| 6 | CeO$_2$ | 1.75 | 50 | 40 |
| Body | APEL | 1.53 | | |

Reference wavelength: 1450 nm

TABLE 18

| Layer | Material | Refractive Index | Thickness (nm) | Layer stress (MPa) |
|---|---|---|---|---|
| Medium | Air | 1.00 | | |
| 1 | SiO$_2$ | 1.46 | 55 | −100 |
| 2 | CeO$_2$ | 1.75 | 15 | 40 |
| 3 | SiO$_2$ | 1.46 | 100 | −100 |
| 4 | CeO$_2$ | 1.75 | 15 | 40 |
| 5 | SiO$_2$ | 1.46 | 80 | −100 |
| 6 | CeO$_2$ | 1.75 | 100 | 40 |
| 7 | SiO$_2$ | 1.46 | 15 | −100 |
| 8 | CeO$_2$ | 1.75 | 80 | 40 |
| Body | APEL | 1.53 | | |

Reference wavelength: 1450 nm

<Evaluation of Antireflection Characteristics>

Figure 20:
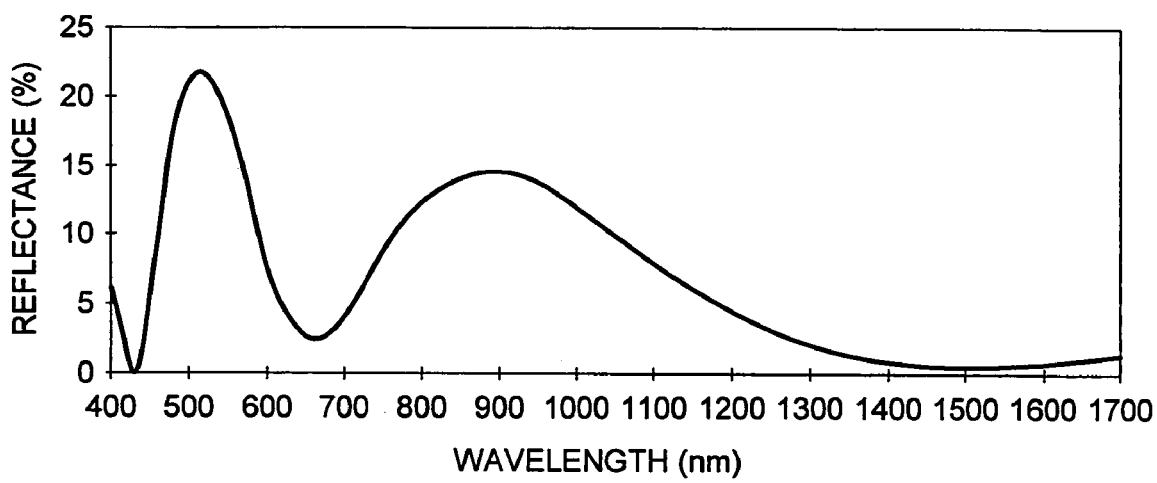
FIG. 20 is a reflectance spectrum of the lens of Example 14.
Figure 21:
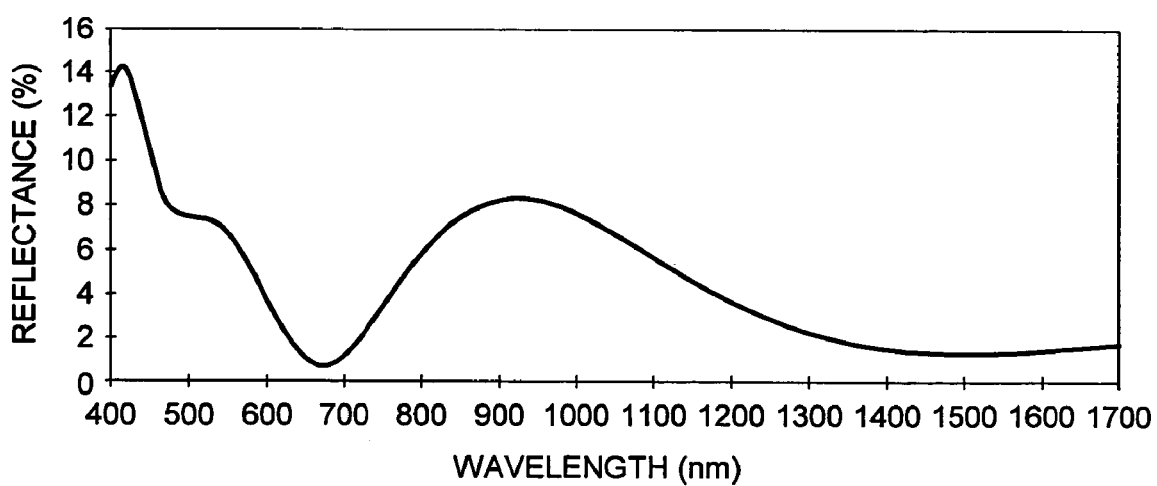
FIG. 21 is a reflectance spectrum of the lens of Example 15.
Figures 22, 23:
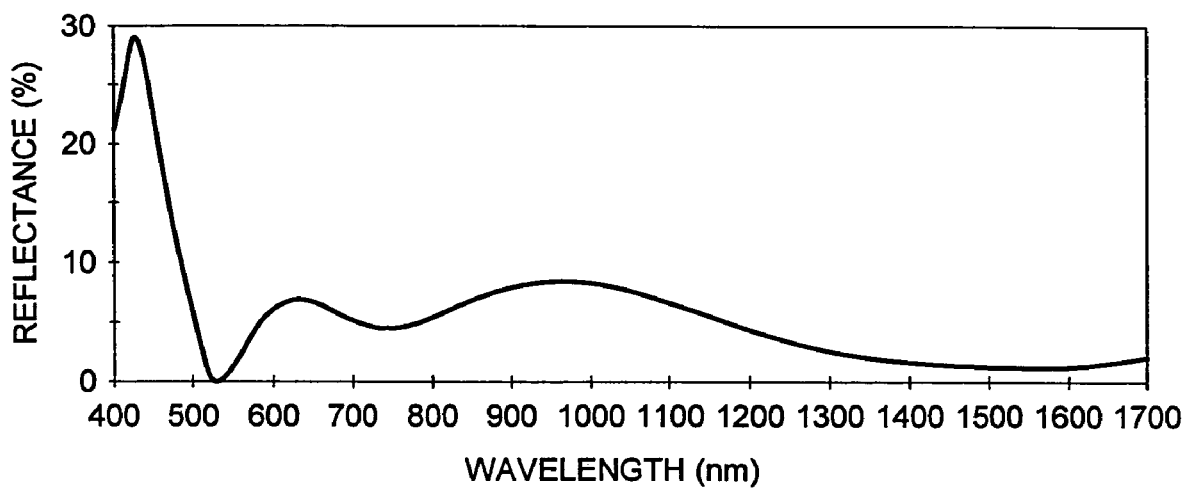
FIG. 22 is a reflectance spectrum of the lens of Example 16.
FIG. 23 summarizes the durability of the lenses of Examples 11 and 14-16.

The results shown in FIGS. 20-22 were obtained upon measuring the antireflection characteristics of the lenses formed according to the Examples 14-16 above. From these results, it was found that in all the lenses satisfactory transmittance was obtained for light in the wavelength range of 1300-1600 nm.

<Evaluation of Durability (1)>

Further, the results of FIG. 23 were obtained when the presence of cracks was checked after the lenses of the Example 11 and of the Examples 14-16 were exposed to high temperature conditions of 100° C. for 2000 hours. From these results, it was found that the durability of the lenses of the Examples 11 and those of the Examples 14 and 16 was high without the generation of cracks that cause problems during actual use. Further, in FIG. 23, "A" indicates that no cracks were generated and "B" indicates that very slight and minute cracks that cause no problem during actual use were generated.

<Evaluation of Durability (2)>

Further, the results of FIG. 23 were obtained when the presence of any peeling in the antireflection coating was checked after the lenses of the Examples 11, and 14-16 were boiled for 1 minute and cooled for 1 minute in running water. From these results, it was found that the durability of the lenses of the Examples 11 and those of the Examples 14-16 was high with no peeling of the antireflection coating that can cause problems during actual use. In addition, it was also found that the durability of the lenses of the Examples 14-16 was high compared to that of the lenses of the Example 11. Further, in FIG. 23, "A" indicates that no peeling of the film was generated, "B" indicates that very slight and minute peeling that causes no problem during actual use was generated.

<Overall Evaluation>

From the above, it was found that the lenses of the Examples 11 and of the Examples 14-16 were suitable for actual use as the lens of optical transceiver module 1 without reducing the light transmittance while further improving the durability compared to the conventional 2-layer shift film.

What is claimed is:

1. An antireflection coating provided on an optical element which passes through at least two wavelengths of light in the wavelength range of 1300-1600 nm, wherein the antireflection coating comprises:
   a high refractive index layer;
   a low refractive index layer having a refractive index lower than a refractive index of the high refractive index layer; and
   a supplementary layer having a composition different from a composition of the high refractive index layer or from a composition of the low refractive index layer, and being provided adjacent to the high refractive index layer or to the low refractive index layer, wherein
   the supplementary layer is provided adjacent to the low refractive index layer; and
   the low refractive index layer and the supplementary layer each comprises a low refractive index material.

2. The antireflection coating of claim 1, wherein
   the antireflection coating comprises two low refractive index layers; and
   the supplementary layer is provided between the two low refractive index layers.

3. The antireflection coating of claim 2, wherein the antireflection coating comprises two supplementary layers each of which is separately provided between the two low refractive index layers, wherein the two supplementary layers are not provided adjacent to each other.

4. The antireflection coating of claim 2, wherein the supplementary layer exhibits a layer stress which is reverse to layer stresses of the low refractive index layers.

5. The antireflection coating of claim 2, wherein
   on a body of the optical element, (i) the high refractive index layer, (ii) the low refractive index layer, (iii) the supplementary layer and (iv) the low refractive index layer, are provided in that order; and
   the two low refractive index layers have the same composition.

6. The antireflection coating of claim 1, wherein a ratio of a thickness of the low refractive index layer to a thickness of the supplementary layer is in the range of 2:1-4:1.

7. The antireflection coating of claim 1, wherein the high refractive index layer comprises a high refractive index material exhibiting a refractive index of 1.8 or more when measured at a wavelength of 1450 nm.

8. The antireflection coating of claim 1, wherein the high refractive index layer comprises a high refractive index material selected from the group consisting of: hafnium dioxide, tantalum(V) oxide (Ta2O5), titanium dioxide and zirconium dioxide.

9. The antireflection coating of claim 1, wherein a thickness of the high refractive index layer is not more than 70 nm.

10. The antireflection coating of claim 1, wherein the supplementary layer exhibits a layer stress higher than a layer stress of the low refractive index layer.

11. The antireflection coating of claim 1, wherein
the high refractive index layer comprises a high refractive index material; and
the low refractive index layer and the supplementary layer each comprises a low refractive index material.

12. The antireflection coating of claim 11, wherein the low refractive index layer comprises silicon dioxide.

13. An optical element comprising a body which passes through at least two wavelengths of light in the wavelength range of 1300-1600 nm and an antireflection coating of claim 1 provided on an optical surface of the body.

14. The optical element of claim 13, wherein a diffraction structure is provided on the optical surface of the body.

15. The optical element of claim 13, wherein the body comprises a plastic material.

16. An optical transceiver module comprising:
a light emitting element and a light receiving element both of which are provided close to an end surface of an optical fiber used for duplex transmission of optical signals; and
the optical element of claim 13, provided between the optical fiber and the light emitting element or the light receiving element.

17. An antireflection coating provided on an optical element which passes through at least two wavelengths of light in the wavelength range of 1300-1600 nm. wherein the antireflection coating comprises:
a high refractive index layer;
a low refractive index layer having a refractive index lower than a refractive index of the high refractive index layer; and
a supplementary layer having a composition different from a composition of the high refractive index layer or from a composition of the low refractive index layer, and being provided adjacent to the high refractive index layer or to the low refractive index layer, wherein
the optical element comprises a first supplementary layer, a second supplementary layer and two high refractive index layers;
the first supplementary layer is provided between the two high refractive index layers;
the second supplementary layer is provided adjacent to the low refractive index layer; and
the low refractive index layer and the supplementary layers each comprises a low refractive index material.

18. The antireflection coating of claim 17, wherein the high refractive index layers each comprises a high refractive index material exhibiting a refractive index of 1.8 or less when measured at a wavelength of 1450 nm.

19. The antireflection coating of claim 17, wherein the high refractive index layers each comprises a high refractive index material selected from the group consisting of: aluminum oxide (Al2O3), cerium oxide (CeO2), lanthanum oxide (La2O3), magnesium oxide (MgO), praseodymium oxide (Pr2O3), scandium oxide (Sc2O3), silicon monoxide (SiO), thorium oxide (ThO2), and yttrium oxide (Y2O3).

20. The antireflection coating of claim 19, wherein at least one of the high refractive index layers comprises cerium oxide (CeO2).

21. The antireflection coating of claim 17, wherein the high refractive index layers each has a thickness of 30-70 nm.

22. The antireflection coating of claim 17, wherein the first supplementary layer has a thickness of 5-30 nm.

23. The antireflection coating of claim 17, wherein the first supplementary layer exhibits a layer stress lower than a layer stress of the high refractive index layer.

24. The antireflection coating of claim 17, wherein
the antireflection coating comprises two low refractive index layers; and
the second supplementary layer is provided between the two low refractive index layers.

25. The antireflection coating of claim 24, wherein
the antireflection coating comprises two second supplementary layers;
each of the two second supplementary layers is separately provided between the two low refractive index layers, wherein the two second supplementary layers are not provided adjacent to each other.

26. The antireflection coating of claim 24, wherein
the second supplementary layer exhibits a layer stress reverse to a layer stress of each of the two low refractive index layers.

27. The antireflection coating of claim 17, wherein a ratio of a thickness of the low refractive index layer being adjacent to the second supplementary layer to a thickness of the second supplementary layer is in the range of 2:1-4:1.

28. The antireflection coating of claim 17, wherein
the second supplementary layer exhibits a layer stress higher than a layer stress of the low refractive index layer.

29. The antireflection coating of claim 17, wherein
on a body of the optical element, (i) the high refractive index layer, (ii) the first supplementary layer, (iii) the high refractive index layer, (iv) the low refractive index layer and (v) the second supplementary layer, are provided in that order; and
the two high refractive index layers have the same composition.

30. The antireflection coating of claim 17, wherein
on a body of the optical element, (i) the high refractive index layer, (ii) the first supplementary layer, (iii) the high refractive index layer, (iv) the second supplementary layer and (v) the low refractive index layer, are provided in that order; and
the two high refractive index layers have the same composition.

31. The antireflect ion coating of claim 17, wherein
on a body of the optical element, (i) the high refractive index layer, (ii) the first supplementary layer, (iii) the high refractive index layer, (iv) the low refractive index layer, (v) the second supplementary layer and (vi) the low refractive index layer, are provided in that order;
the two high refractive index layers have the same composition; and
the two low refractive index layers have the same composition.

32. The antireflection coating of claim 17, wherein
the high refractive index layer comprises a high refractive index material; and the low refractive index layer and the supplementary layer each comprises a low refractive index material.

33. The antireflection coating of claim 32, wherein the low refractive index layer comprises silicone dioxide.

34. An optical element comprising a body which passes through at least two wavelengths of light in the wavelength range of 1300-1600 nm and an antireflection coating of claim 17 provided on an optical surface of the body.

35. The optical element of claim 34, wherein a diffraction structure is provided on the optical surface of the body.

36. The optical element of claim 34, wherein the body comprises a plastic material.

37. An optical transceiver module comprising:
   a light emitting element and a light receiving element both of which are provided close to an end surface of an optical fiber used for duplex transmission of optical signals; and
   the optical element of claim 34, provided between the optical fiber and the light emitting element or the light receiving element.

* * * * *